US011159417B2

(12) United States Patent
Ceyssens

(10) Patent No.: US 11,159,417 B2
(45) Date of Patent: Oct. 26, 2021

(54) MONITORING A DISTRIBUTED APPLICATION SERVER ENVIRONMENT

(71) Applicant: AMADEUS S.A.S., Biot (FR)

(72) Inventor: Tom Albert Louis Ceyssens, Poing (DE)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 17/017,595

(22) Filed: Sep. 10, 2020

(65) Prior Publication Data

US 2021/0119899 A1    Apr. 22, 2021

(30) Foreign Application Priority Data

Oct. 17, 2019 (FR) ...................................... 1911591

(51) Int. Cl.
| | |
|---|---|
| *H04L 12/26* | (2006.01) |
| *G06F 16/27* | (2019.01) |
| *H04L 12/24* | (2006.01) |
| *H04L 29/08* | (2006.01) |

(52) U.S. Cl.
CPC .............. *H04L 43/50* (2013.01); *G06F 16/27* (2019.01); *H04L 41/069* (2013.01); *H04L 67/10* (2013.01)

(58) Field of Classification Search
CPC .............................. H04L 65/608; H04L 67/02
USPC .......................................................... 709/219
See application file for complete search history.

(56) References Cited

U.S. PATENT DOCUMENTS

| | | | | |
|---|---|---|---|---|
| 6,167,431 A | * | 12/2000 | Gillies ...................... | G06F 8/71 |
| | | | | 709/203 |
| 6,751,789 B1 | | 6/2004 | Berry et al. | |
| 8,312,660 B1 | * | 11/2012 | Fujisaki .................. | F41A 17/08 |
| | | | | 42/70.11 |
| 8,676,273 B1 | * | 3/2014 | Fujisaki ................ | H04M 3/533 |
| | | | | 455/567 |
| 9,684,524 B1 | | 6/2017 | Porter et al. | |
| 2012/0166487 A1 | * | 6/2012 | Stougie ............... | G06F 11/1076 |
| | | | | 707/792 |
| 2016/0218942 A1 | * | 7/2016 | Choquette ............... | H04L 67/02 |

(Continued)

FOREIGN PATENT DOCUMENTS

| | | |
|---|---|---|
| CN | 106776257 A | 5/2017 |
| CN | 109947627 A | 6/2019 |

OTHER PUBLICATIONS

INPI, Search Report with English translation, dated Jul. 9, 2020 re French Patent Application No. 1911591.

*Primary Examiner* — Tesfay Yohannes

(74) *Attorney, Agent, or Firm* — Perry + Currier

(57) ABSTRACT

A computer-implemented method and data processing system for monitoring a distributed application server environment connected to a plurality of client terminals, wherein a client terminal requests at least one fulfillment of a task during a session, a task requiring the execution of at least one of a plurality of applications, is presented. The method includes storing log files on at least one database server, retrieving at least one log file from the at least one database server, generating an application call tree for a fulfillment of a task from the at least one log file, aggregating a plurality of application call trees for the same task to generate an averaged application call tree, analyzing the averaged application call tree with regard to performance issues, and, in response to a detection of a performance issue, generating an output message.

20 Claims, 7 Drawing Sheets

(56) References Cited

U.S. PATENT DOCUMENTS

| | | | |
|---|---|---|---|
| 2017/0193110 A1* | 7/2017 | Crabtree | G06F 16/951 |
| 2018/0007099 A1* | 1/2018 | Ein-Gil | G06F 9/468 |
| 2019/0190987 A1* | 6/2019 | Waffner | H04L 67/104 |
| 2019/0291277 A1* | 9/2019 | Oleynik | B25J 9/1669 |
| 2019/0310977 A1* | 10/2019 | Pal | G06F 16/2228 |

* cited by examiner

| SessionID | TaskID | CallSeqNo | Timestamp | Application | |
|---|---|---|---|---|---|
| 301 | 302 | 303 | 304 | 305 | |
| 123456 | 1213 | 1 | 159.357 | APPL10 | 306 |
| 123456 | 1213 | 1-1 | 160.147 | APPL20 | 307 |
| 123456 | 1213 | 1-1-1 | 160.478 | APPL34 | 308 |
| 123456 | 1213 | 1-1-3 | 160.478 | APPL36 | 309 |
| 123456 | 1213 | 1-2-1 | 161.211 | APPL77 | 310 |
| 123456 | 2207 | 1 | 179.663 | APPL12 | |
| 123456 | 2207 | 1-1 | 179.912 | APPL81 | |
| 123456 | 2207 | 1-1-1 | 180.776 | APPL91 | |
| 123456 | 2207 | 1-2 | 180.001 | APPL82 | |

FIG. 3a

```
       321         322    323    324      325
HEADER|A8ZH0Z759|3|NNRRRQ|192.000.113.195
3|root|1276.788|NNRRRQ|192.00.113.195|%|...            — 326
3->1|3|576.781|APP481|171.25.124.146|75.12|...          — 327
3->1->1|3->1|575.936|APP580|162.149.216.27|60.10|...    — 328
3->2|3|699.576|APP739|40.28.47.191|44.82|...            — 329

HEADER|ASDE7PLW9|7|889.008|PBCAUQ|252.99.43.207         — 330
...
```

FIG. 3b

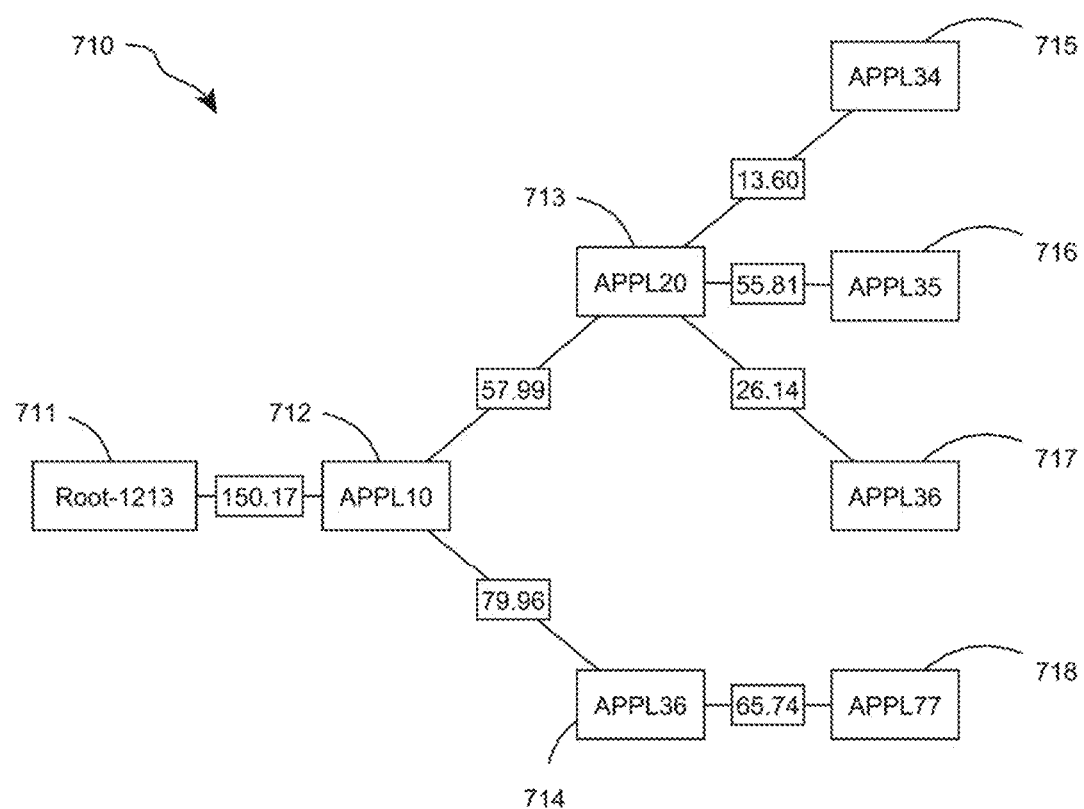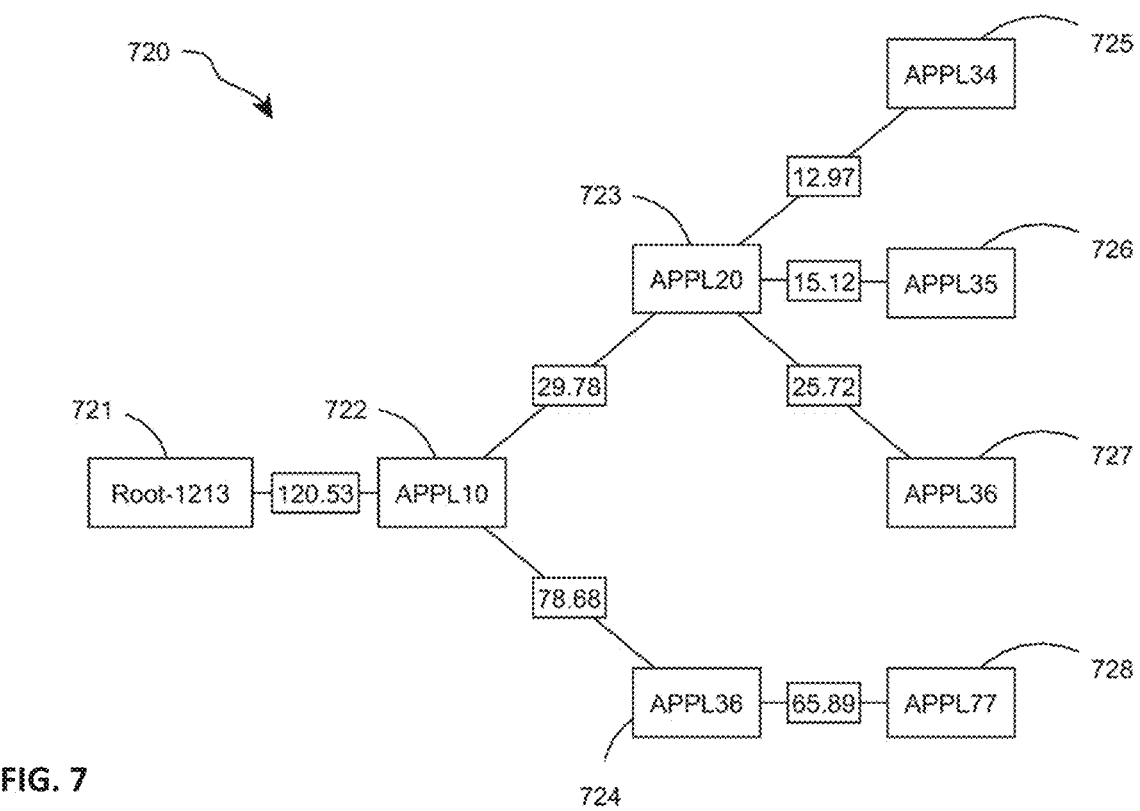
FIG. 7

MONITORING A DISTRIBUTED APPLICATION SERVER ENVIRONMENT

CROSS REFERENCE TO RELATED APPLICATIONS

This application claims priority to French patent application no. 1911591, filed Oct. 17, 2019, the contents of which are incorporated herein by reference.

FIELD

The invention generally relates to computers and computer software, and in par-ticular to methods, systems, and computer programs for monitoring a distributed application server environment.

BACKGROUND

Monitoring a distributed application server environment is essential for ensuring integrity of the server environment. Hence, it is imperative to detect performance issues and modify the distributed application server environment accordingly.

However, the detection of performance issues in a distributed application server environment, in which a plurality of distributed application servers executes a plurality of application, requires a vast amount of data to be analyzed. Due to the distribution and heterogeneity of the servers and the executed applications, the collection of data may be problematic. For example, the collected data may comprise data records that cannot be analyzed or data records may be totally missing because of connectivity problems, server outages, application issues or the like.

SUMMARY

Monitoring methods and systems are required that are able to handle a large number of data records as well as missing data records.

According to a first aspect of the invention, a computer-implemented method for monitoring a distributed application server environment connected to a plurality of client terminals is presented. A client terminal requests at least one fulfillment of a task during a session and a task requires the execution of at least one of a plurality of applications. The method comprises storing log files on at least one database server, wherein the log files comprise data records associated with calls of applications executed for a fulfillment of a task, wherein a data record comprise a session identifier for identifying the session, a task identifier for identifying the task and a calling sequence number for identifying the sequence of called applications during a fulfillment of a task.

The method further comprises retrieving at least one log file from the at least one database server, wherein at least one data record for a call of an application is missing in at least one of the log files and generating an application call tree for a fulfillment of a task from the at least one log file, the application call tree comprising nodes representing called applications during the fulfillment of the task and links representing calling relationships between the applications required to fulfill the task. Thereby, generating the application call tree comprises adding nodes and links to the application call tree based on the calling sequence numbers comprised by the data records of the at least one log file and storing data comprised by the data records at the respective node and/or link.

The method further comprises aggregating a plurality of application call trees for the same task to generate an averaged application call tree, wherein the average application call tree comprises statistical data calculated based on data stored at the application call trees, analyzing the averaged application call tree with regard to performance issues, and in response to a detection of a performance issue, generating an output message.

According to a second aspect of the invention, a system for monitoring a distributed application server environment connected to a plurality of client terminals is presented. A client terminal requests at least one fulfillment of a task during a session and a task requires the execution of at least one of a plurality of applications. The distributed application server environment comprises a plurality of application servers, on which the plurality of applications is executed, at least one database server, a central control unit connected to the plurality of application servers, to the at least one database server and to the plurality of client terminals, and an analysis module connected at least to the database server.

The central control unit is configured to store log files on at least one database server, wherein the log files comprise data records associated with calls of applications executed for a fulfillment of a task, wherein a data record comprise a session identifier for identifying the session, a task identifier for identifying the task and a calling sequence number for identifying the sequence of called applications during a fulfillment of a task.

The analysis module is configured to retrieve at least one log file from the at least one database server, wherein at least one data record for a call of an application is missing in at least one of the log files, and generate an application call tree for a fulfillment of a task from the at least one log file, the application call tree comprising nodes representing called applications during the fulfillment of the task and links representing calling relationships between the applications required to fulfill the task, by adding nodes and links to the application call tree based on the calling sequence numbers comprised by the data records of the at least one log file, and storing data comprised by the data records at the respective node and/or link. The analysis module is further configured to aggregate a plurality of application call trees for the same task to generate an averaged application call tree, wherein the average application call tree comprises statistical data calculated based on data stored at the application call trees, analyze the averaged application call tree with regard to performance issues, and in response to a detection of a performance issue, generate an output message. In embodiments, the analysis module is configured to fulfill further features of the presented method as described herein.

According to a third aspect of the invention, a computer program is presented that comprises instructions which, when the program is executed by a computer, cause the computer to carry out the method described herein.

BRIEF DESCRIPTIONS OF THE DRAWINGS

The subsequent description of embodiments is based on the accompanying set of figures in which similar reference numerals refer to similar elements and in which.

FIG. 3a and

Figure 4:
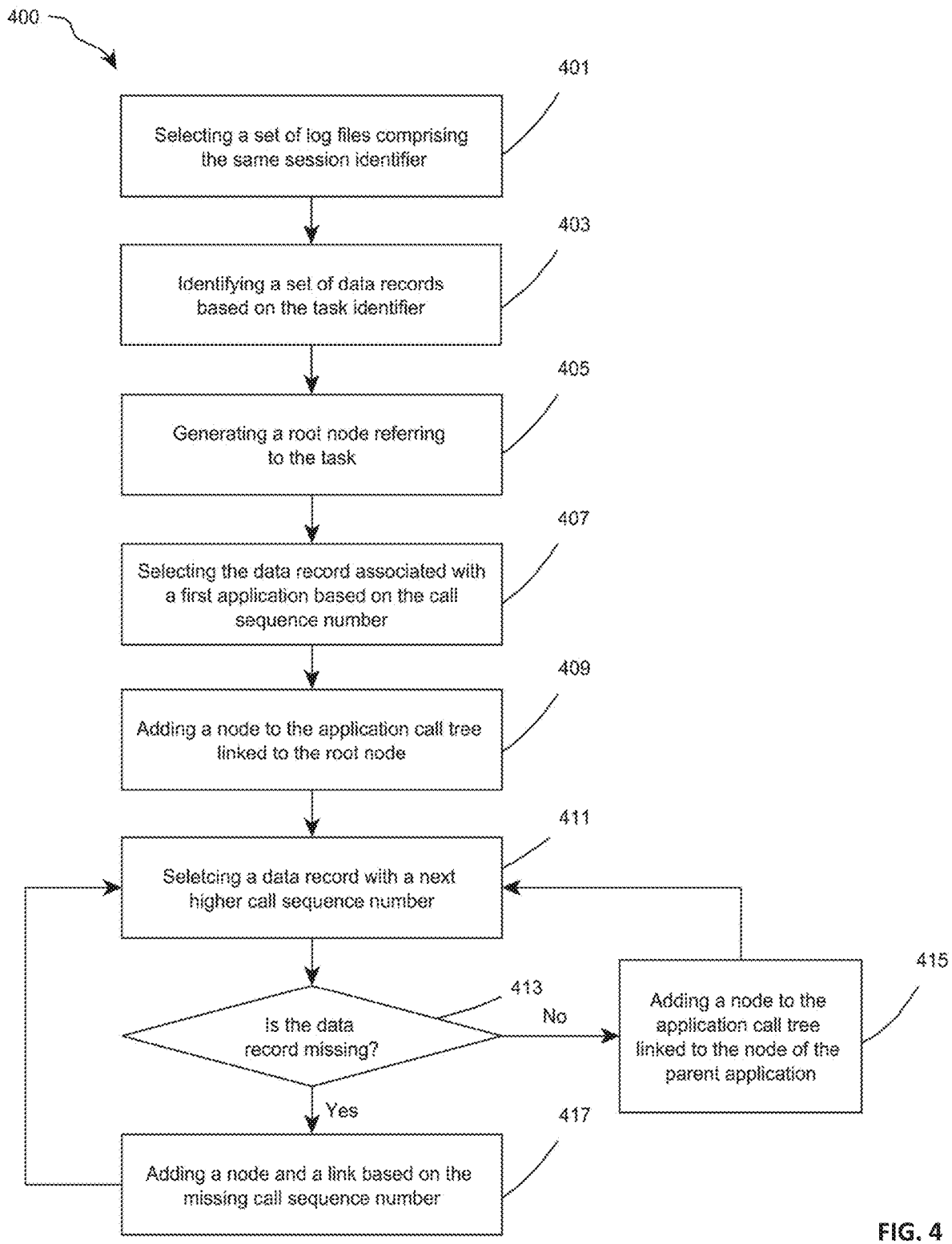
Figure 5:
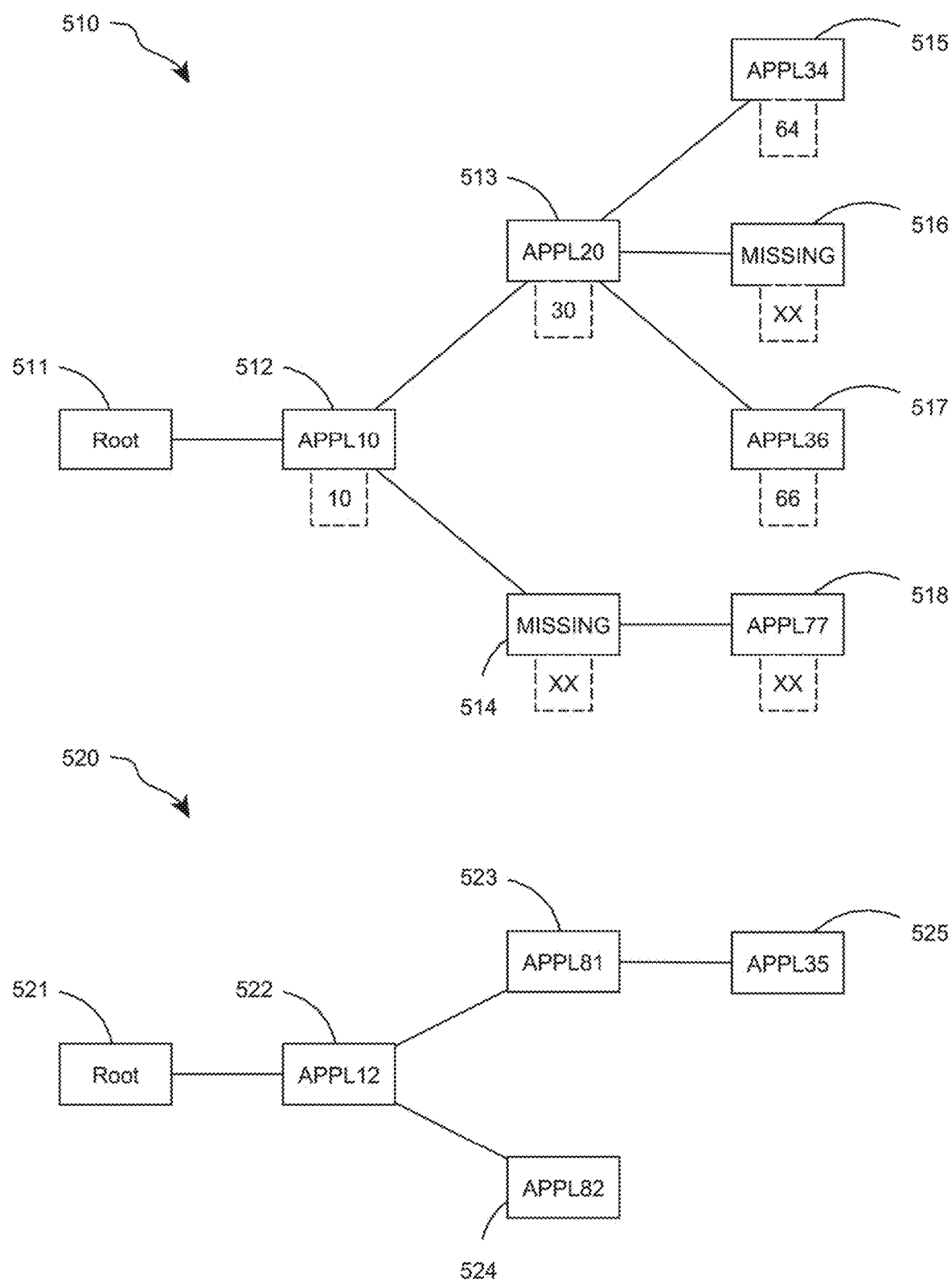
Figure 6:
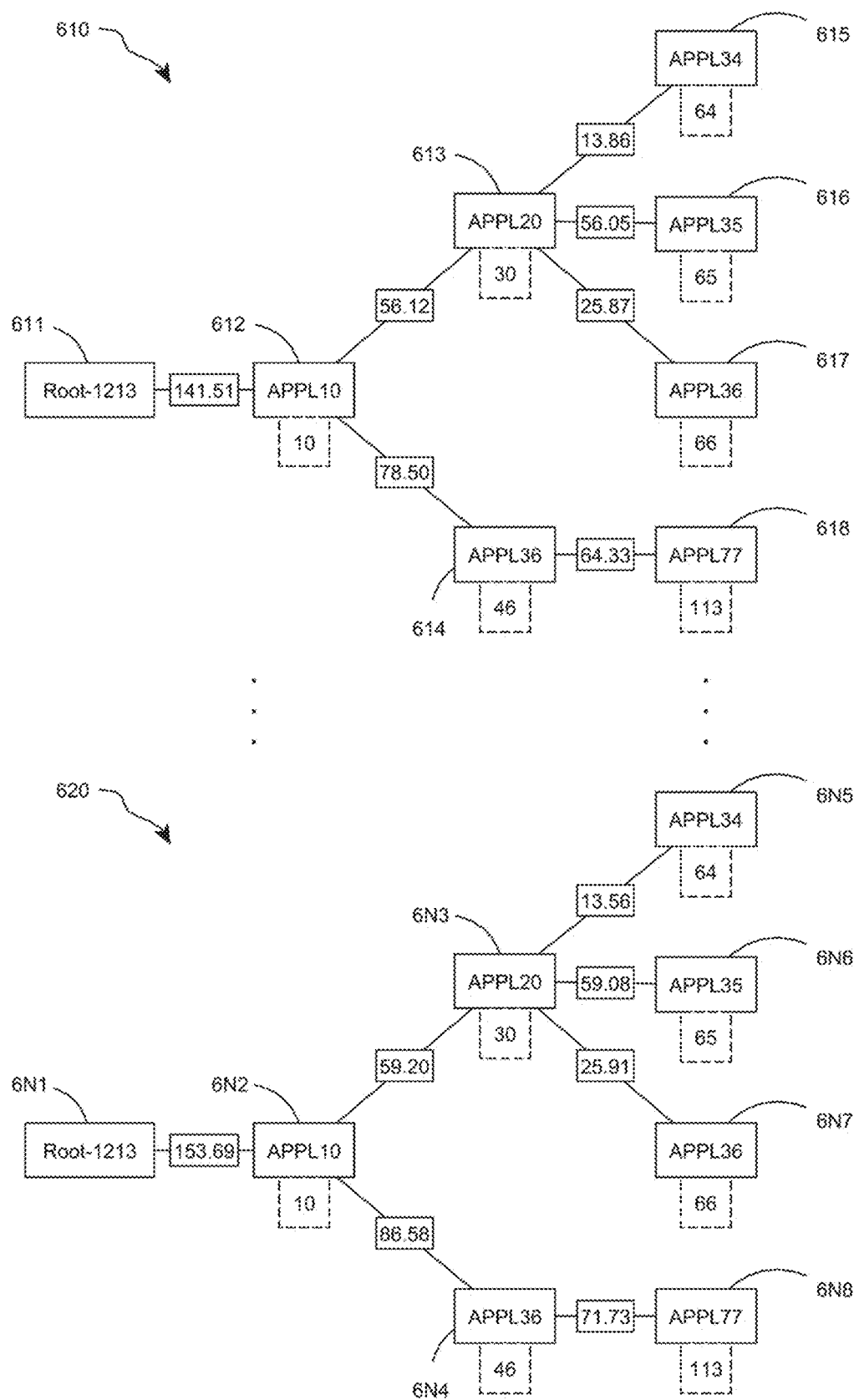

FIG. 3b show two examples of log files;

FIG. 4 depicts a flowchart of generating an application call tree from a log file;

FIG. 5 shows two example application call trees generated from the log file of FIG. 3a;

FIG. 6 shows N example application call trees for the same task; and

FIG. 7 shows two example averaged application call trees for the same task.

DETAILED DESCRIPTION

As already stated above, the invention relates to methods, systems, and computer programs for monitoring a distributed application server environment. The technical aim of monitoring a distributed application server environment is generally to detect problems within the server environment, e.g. an outage of a server or a partition of a server, a programming bug of an application executed on the servers, a routing problem from one to another server, and the like. All these problems usually lead to a reduced performance of the application server environment. In response to detecting such a performance issue, the application server environment can be modified to retain reliability and integrity.

According to a first aspect of the invention, a computer-implemented method for monitoring a distributed application server environment connected to a plurality of client terminals is presented. A client terminal requests at least one fulfillment of a task during a session and a task requires the execution of at least one of a plurality of applications. The method comprises storing log files on at least one database server, wherein the log files comprise data records associated with calls of applications executed for a fulfillment of a task, wherein a data record comprise a session identifier for identifying the session, a task identifier for identifying the task and a calling sequence number for identifying the sequence of called applications during a fulfillment of a task.

The method further comprises retrieving at least one log file from the at least one database server, wherein at least one data record for a call of an application is missing in at least one of the log files and generating an application call tree for a fulfillment of a task from the at least one log file, the application call tree comprising nodes representing called applications during the fulfillment of the task and links representing calling relationships between the applications required to fulfill the task. Thereby, generating the application call tree comprises adding nodes and links to the application call tree based on the calling sequence numbers comprised by the data records of the at least one log file and storing data comprised by the data records at the respective node and/or link.

The method further comprises aggregating a plurality of application call trees for the same task to generate an averaged application call tree, wherein the average application call tree comprises statistical data calculated based on data stored at the application call trees, analyzing the averaged application call tree with regard to performance issues, and in response to a detection of a performance issue, generating an output message.

In an embodiment, adding nodes and links to the application call tree comprises selecting a set of log files comprising the same session identifier and identifying a set of data records comprised by the set of log files based on the task identifier. Adding nodes and links to the application call tree further comprises generating a root node referring to the task, selecting the data record among the set of data records associated with a first application based on the call sequence number, wherein the first application is the application that is called first during the fulfillment of the task, and adding a node to the application call tree for the first application, wherein the node is linked to the root node. Moreover, adding nodes and links to the application call tree further comprises repeatedly selecting a data record with a next call sequence number and adding a node to the application call tree for the respective application with a link to the node of a parent application, wherein the parent application is the application calling the respective application during fulfillment of the task, and in response to detecting a missing data record for a call of an application based on a missing call sequence number, adding a node and a link based on the missing call sequence number to the application call tree.

In another embodiment, generating the application call tree comprises calculating a checksum for a node, wherein the checksum is at least partially based on at least one parent application during fulfillment of the task and storing the checksum at the node, and aggregating a plurality of application call trees for the same task comprises comparing the checksums of the nodes of the plurality of application call trees for determining nodes to be aggregated. In an embodiment, the checksum is created as a 128-bit MD5 checksum from a string comprising at least a part of the data stored in the data records for at least one parent application.

In yet another embodiment, the method further comprises generating a knowledge database, wherein the knowledge database comprises information about generated application call trees. Furthermore, generating the application call tree further comprises determining for nodes and links, which were added to the application call tree based on a missing call sequence number, data to be stored at the respective node and/or link based on the knowledge database, and marking the application call tree as modified.

In an embodiment, a data record associated with a call of an application further comprises at least one of a reference to the parent application of the respective application, a time stamp of the call of the respective application, a time stamp of the return of the respective application, a computational load of the executing application server, a computational capacity of the executing application server, and a IP address of the executing application server. In another embodiment, the statistical data comprised by the averaged application call tree comprises at least one of number of total calls of the respective application, percentage of calls for the respective application for fulfilling the task, and mean computational load of the respective executing application servers. In yet another embodiment, the statistical data comprised by the averaged application call tree comprises at least one of mean, maximum and minimum response times of the respective application.

In another embodiment, analyzing the averaged application call tree with regard to performance issues comprises comparing the statistical values of the generated averaged application call tree with the statistical values of a previously generated averaged application call tree of the same task, and in response to the difference of a statistical value of the generated averaged application call tree to the corresponding statistical value of the previously generated averaged application call tree exceeds a threshold, detecting a performance issue. In yet another embodiment, retrieving at least one log file from the at least one database server, generating an application call tree for a fulfillment of a task and/or aggregating a plurality of application call trees are repeatedly executed at predetermined times for tasks comprised by log files stored between the previous time of execution and the current time of execution.

In an embodiment, the generated application call trees and/or the averaged application call trees are stored on a database server. In another embodiment, the output message initiates a modification of the distributed application server environment, wherein the modification comprises at least one of adding a new application server to the distributed application server environment, redirecting the execution of an application from one application server to another application server within the distributed application server environment, and reconfiguring a sequence, in which the applications are called for execution of a task.

According to a second aspect of the invention, a system for monitoring a distributed application server environment connected to a plurality of client terminals is presented. A client terminal requests at least one fulfillment of a task during a session and a task requires the execution of at least one of a plurality of applications. The distributed application server environment comprises a plurality of application servers, on which the plurality of applications is executed, at least one database server, a central control unit connected to the plurality of application servers, to the at least one database server and to the plurality of client terminals, and an analysis module connected at least to the database server.

The central control unit is configured to store log files on at least one database server, wherein the log files comprise data records associated with calls of applications executed for a fulfillment of a task, wherein a data record comprise a session identifier for identifying the session, a task identifier for identifying the task and a calling sequence number for identifying the sequence of called applications during a fulfillment of a task.

The analysis module is configured to retrieve at least one log file from the at least one database server, wherein at least one data record for a call of an application is missing in at least one of the log files, and generate an application call tree for a fulfillment of a task from the at least one log file, the application call tree comprising nodes representing called applications during the fulfillment of the task and links representing calling relationships between the applications required to fulfill the task, by adding nodes and links to the application call tree based on the calling sequence numbers comprised by the data records of the at least one log file, and storing data comprised by the data records at the respective node and/or link. The analysis module is further configured to aggregate a plurality of application call trees for the same task to generate an averaged application call tree, wherein the average application call tree comprises statistical data calculated based on data stored at the application call trees, analyze the averaged application call tree with regard to performance issues, and in response to a detection of a performance issue, generate an output message. In embodiments, the analysis module is configured to fulfill further features of the presented method as described herein.

According to a third aspect of the invention, a computer program product is presented, wherein the computer program product is provided on a non-transitory computer readable medium and comprises program code for the execution of the method described herein, the computer program being carried out on a computer or computer system.

Figure 1:
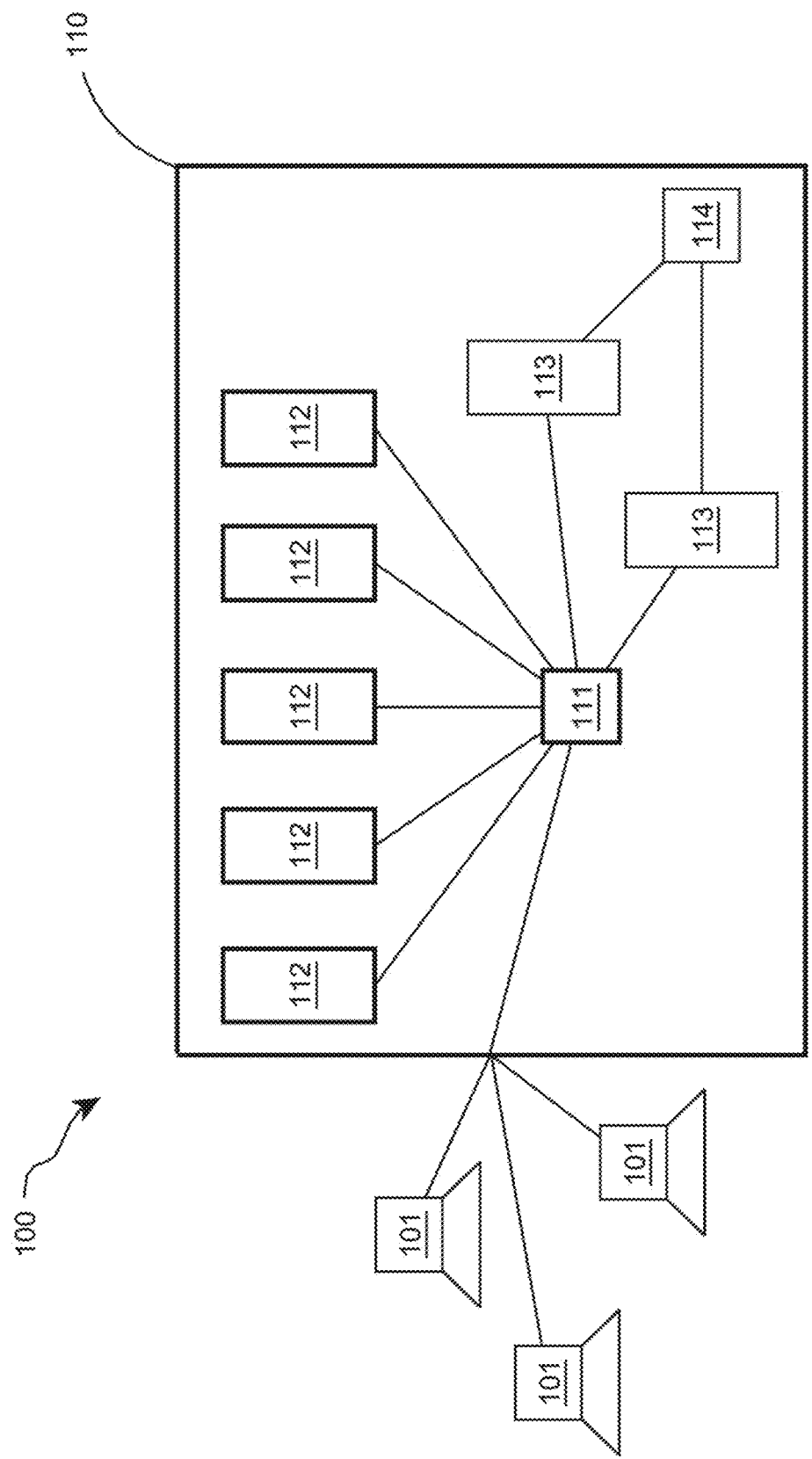
FIG. 1 depicts an example of a possible client-server infrastructure comprising a distributed application server environment as described herein.

FIG. 1 illustrates an example of an example of an client-server infrastructure 100 comprising a distributed application server environment 110. In accordance with an embodiment, the distributed application server environment 110 comprises a central control unit 111 and a plurality of distributed application servers 112 and is connected to a plurality of client terminals 101. The distributed application servers 112 can be virtual servers, wherein a plurality of virtual servers is run on a physical server. Alternatively or additionally, at least some of the virtual servers are virtualized in a cloud environment. Moreover, the distributed application servers 112 may be executed on physical servers in one server farm or distributed over several server farms at one location or different geographical distant locations.

The client terminals 101 may be personal computers, laptop computers, tablet computers, mobile phones, or any other suitable computing devices. The client terminals 101 are connected to the distributed application server environment 110 through one or more private or public networks, e.g. the Internet or a local area network. Requests sent from client terminals 101 to the distributed application server environment 110 are routed to the central control unit 111, which subsequently organizes to which application servers 112 the requests will be routed.

In the example of FIG. 1, the distributed application server environment 110 further comprises at least one database server 113 that is connected to an analysis module 114. In some embodiments, the database servers 113 store log files that comprise data about the execution of applications on the application servers. The database servers 113 may also store information generated by the analysis module 114, such as application call trees and averaged application call trees as described in the following. The central control unit 111 and the analysis module 114 may be different physical or virtual units of the environment, however, the central control unit 111 can also comprise the analysis module 114.

Other configurations of the client-server infrastructure 100 and the distributed application server environment 110 are possible. For example, the central control unit 111 may also be directly connected to the analysis module 114. In this case, the analysis module 114 is not directly but indirectly, i.e. over the central control unit 111, connected to the database servers 113. In some examples, the client terminals 101 are directly connected to another server (not shown), for example an API Gateway server or a Web server, which then routes the requests to the central control unit 111.

Figure 2:
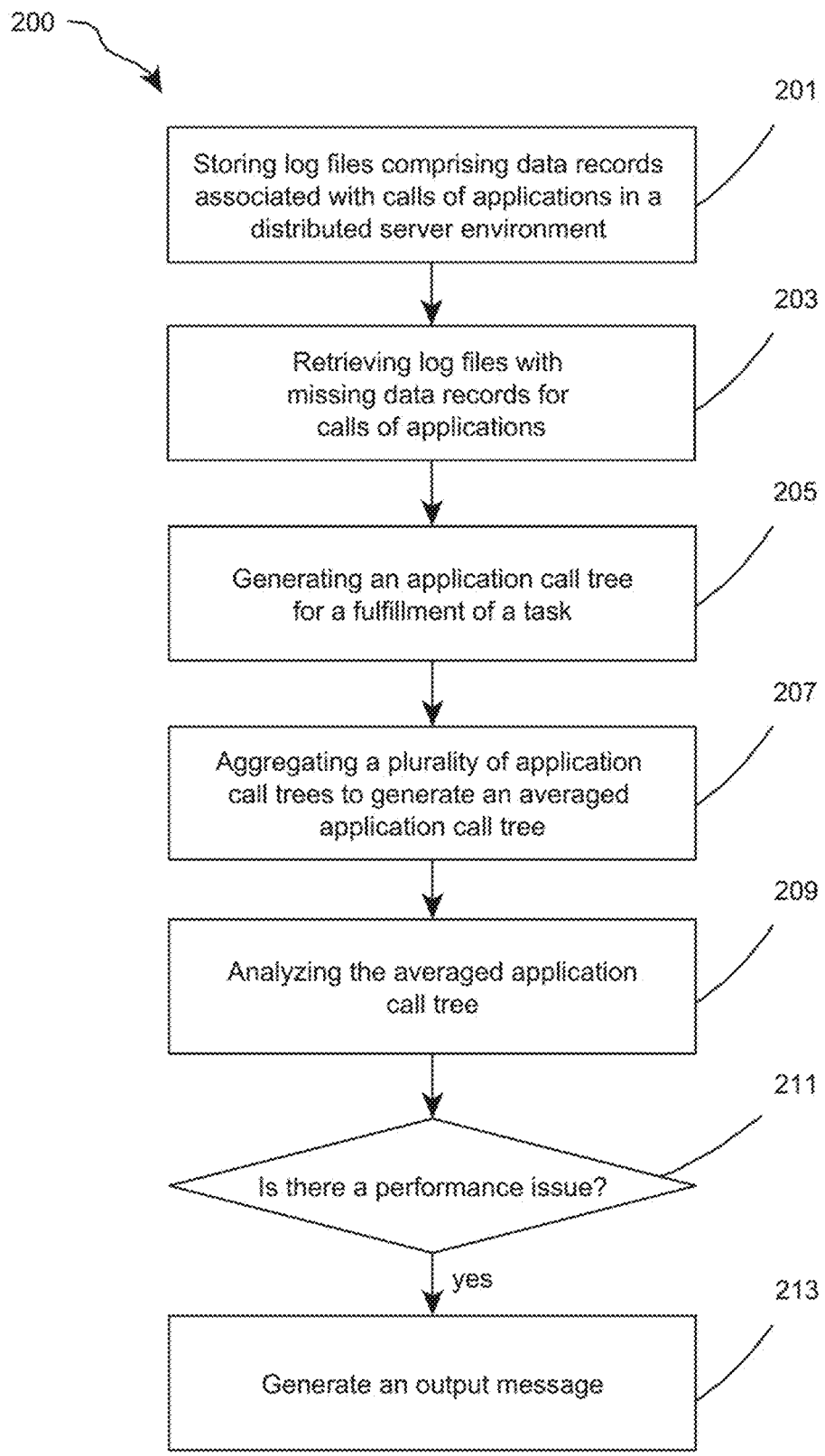
FIG. 2 depicts a flowchart of the method described herein.

The method 200 for monitoring a distributed application server environment 110 of FIG. 2 may be performed in such a distributed application server environment 110 as depicted in FIG. 1. In the distributed application server environment 110, the central control unit 111 logs data associated with requests from client terminals 101 concerning fulfillment of tasks in log files and store them on at least one database server (box 201), such as the database server 113. The logged tasks are, for example, logging in an account, registration of a user, registration of a client terminal, requesting a plurality of data sets from a database, booking a hotel, flight and/or car, payment transactions, display of a website and any other task that may be fulfilled by a distributed application server environment 110. The log files may also be generated and stored by the application servers 112 or other components of the application server environment, e.g. the analysis module 114.

The log files comprise data records associated with calls of applications during a fulfillment of a task. The data records comprise—beyond other data—a session identifier for identifying the session, a task identifier for identifying the task and a calling sequence number for identifying the sequence of called applications during a fulfillment of a task. These specific identifiers/numbers can have any suitable form/format.

To monitor the distributed application server environment 110, the analysis module 114 retrieves log files (box 203). As the distributed server environment, e.g. the distributed application server environment 110 of FIG. 1, may be heavily distributed or as some components may not work in a desired manner, it might happen that data for some calls of applications is not logged correctly or is completely missing. Thus, the situation is considered in which at least one data record for a call of an application is missing in the log files that are received by the analysis module 114.

From the received log files, at least one application call tree is generated (box 205). An application call tree comprises nodes representing called applications during the fulfillment of the task and links representing calling relationships between the applications required to fulfill the task. The nodes and links are added to the application call tree based on the calling sequence numbers comprised by the data records. Moreover, data comprised by a data record of a call of an application is stored at the respective node and/or link. Retrieving the log files from the at least one database server, generating an application call tree for a fulfillment of a task and/or aggregating a plurality of application call trees may be performed at predetermined times, e.g. every hour, every day, every week or every year. Therefore, only log files stored between the previous time of execution and the current time of execution mare retrieved for which application call trees are generated. If the distributed application server environment 110 is a large environment with many requests from client terminals, the time period may be shorter than for smaller less frequently requested environments.

When a plurality of application call trees has been generated for a task, some of all of these application call trees are aggregated (box 207) to generate an averaged application call tree for that task. This averaged application call tree comprises statistical data that is at least partially calculated based on the data stored in the single application call trees generated before. In some embodiments, the statistical data comprises at least one of number of total calls of the respective application, percentage of calls for the respective application for fulfilling the task, and mean computational load of the respective executing application servers. Additionally or alternatively, the statistical data comprises at least one of mean, maximum and minimum response times of the respective application in the aggregated application call trees. The aggregating may also be performed at predetermined times, e.g. every hour, every day, every week or every year.

The averaged application call tree is then analyzed (box 209). Therefore, a computer program automatically extracts the statistical values and compare them to statistical values of previously generated averaged application call trees of the same task. If the difference of a statistical value of the averaged application call tree to the corresponding statistical value of the previously generated averaged application call tree(s) exceeds a threshold, the computer program detects a performance issue. For example, mean response times of applications in the averaged application call trees may be compared. If an application in the newly generated application call tree requires more time to be executed than before, i.e. compared to the response times of the previously generated averaged application call trees, a performance issue of the application and/or the server executing the application is detected.

Additionally or alternatively, the statistical values comprised by the averaged application call tree are analyzed as such. In this case, if statistical values on specific links are unexpectedly high or low, e.g. exceeding a predetermined threshold, a performance issue is detected. For example, if a mean response time of an application is much higher than the response times of the other application in the averaged application call tree, than this application leads to performance issues when executing the underlying task. In another example, if the number of calls of an application in the averaged application call tree is very low, i.e. it is only executed sometimes when fulfilling the task, this might be an error and also lead to a detected performance issue.

If a performance issue is detected (box 211), the analysis module 114 generates an output message (box 213). Such an output message may be a file stored on a memory to be read by an application, a displayed text on a computer screen, a signal transmitted to a modification module that initiates a modification of the distributed application server environment, or the like. In an example, the modification of the distributed application server environment is at least one of adding a new application server to the distributed application server environment 110, redirecting the execution of an application from one application server to another application server within the distributed application server environment 110, and reconfiguring a sequence, in which the applications are called for execution of a task.

Any modification that solves or reduces the performance issue is applicable. For example, if the averaged application call tree shows that the mean CPU usage of an application server or a plurality of application server executing one of the applications is exceeding a threshold, e.g. a threshold between 70% and 95%, and that the mean response time of the application is also unnormal high compared to previous generated averaged application call trees, new application servers designated to execute the respective application may be added to the application server environment 110. As another example, if a mean response time of an application is higher than the mean response times of other applications in the averaged application call tree, in a new software version for fulfilling the task may change the sequence of the calls. That is, this application, which has a high response time, is called in parallel with other applications and/or its call is—if applicable—moved to the beginning of the task fulfillment.

FIG. 3a and FIG. 3b show two exemplary log files. These are only exemplified. A log file may comprise data records that belong to one singular fulfillment of a task or may comprise data records for a plurality of fulfillments of tasks. It may also only comprise one data record for one call of an application. A log file can be specific for a user terminal session, i.e. it only comprises data records for fulfillments of tasks that have been requested during one singular user terminal session. Alternatively, a log file may comprise data records of a predetermined time period, e.g. 0.1 s, 0.3 s, 10 s, or any other suitable time period, which comprises data records for all application calls during this period.

FIG. 3a shows an example of a log file. The column headers, which may also be omitted, define the content of the columns. There is a column header for a session identifier "SessionID" 301, a task identifier "TaskID" 302, a call sequence number "CallSeqNo" 303, a time stamp "Timestamp" 304, and a called application "Application" 305. The next lines comprise data records for application calls.

On the example of the first line, i.e. data record 306, the data record concerns the session of a client terminal with the session identifier "123456". The session identifier may be a random number, related to the IP address of the client terminal, or generated by any other suitable method. The client terminal requested fulfillment of the task with the task identifier "1213", which is for example a login on a webpage. The call sequence number of the first line 306 is "1", which means that it is the first call in this fulfillment of the task "1213". The time stamp "159.357" marks the time the respective application "APPL10" was called. In this case, if the task "1213" is a login on a webpage, "APPL10" may be the identifier for the application that initiates the login.

The following lines, i.e. data records 307, 308, 309, and 310, of the log file of FIG. 3a, concern other calls of applications during the fulfillment of task "1213". For example, if the task "1213" is a login on a webpage as considered above, then the next called application "APPL20", identified based on the call sequence number "1-1" may be an application searching a database for the username and checking that password is correct. "APPL34" may be, in this example, an application requesting user details from another external database and "APPL36" may be an application loading specific advertising for this user.

As can be seen, the log file also comprises data records for a second task, the task with the task identifier "2207". The single tasks may also be stored in different log files or in any other manner suitable for the problem as long as the data records comprise a session identifier for identifying the session, a task identifier for identifying the task and a calling sequence number for identifying the sequence of called applications during a fulfillment of a task;

FIG. 3b shows another example of a log file. In this case, the data records for one fulfillment of a task a grouped together with a common header and separated from data records for other tasks by a blank line. The header line is identified by the word "HEADER" 321. In this example, the data items are separated by a "I". Any other separation marks are possible. The next data item in the header line is the session identifier "A8ZH0Z759" 322 that is unique to a client terminal session. The number "3" 323 is a consecutive number that may for example identify the requested task as being the third requested task of this client terminal session. In this example, the task identifier "NNRRRQ" 324 is followed by the IP address 325 of the server that receives the request.

The next four lines concern the application calls performed during the fulfillment of the task "NNRRRQ". Each data record, i.e. each line comprises, in a row, the call sequence number, the call sequence number of the parent application calling the respective application, the response time of the called application, an application identifier, the IP address of the executing application server, and the CPU processor utilization of the executing application server. Moreover, each data record can comprise further data, indicated with " . . . " in the example log file of FIG. 3b. For example, this further data comprises a time stamp of the call of the respective application, a time stamp of the return of the respective application, and/or a computational capacity of the executing application server.

The first data record 326 after the first header line of the example log file defines the root of the application calls. The other three data records are data records for the respective application calls. For example, the second data record 327 comprises data concerning the call of the application "APP481". Before generating an application call tree, the log files may also be modified to facilitate the generation of the application call tree. Some data records, such as the first line 326, may not be recorded during fulfillment of the task but added later before generating the application call tree. Some other data records may be modified in order to enhance the recorded data. In an example, the additional or modified data records also comprise data that has been extracted from or calculated based on the already existing data records. Moreover, the additional or modified data records may be marked or flagged in order to distinct them from unmodified recorded data records.

When a plurality of log files, such as the log files of FIG. 3a, FIG. 3b, or any other suitable kinds of log files, have been generated and stored, the analysis module 114 or any other module that is included in or connected with the distributed application server environment 110 may retrieve the log files and generate application call trees to monitor the distributed application server environment 110.

The flowchart of FIG. 4 shows an embodiment how to generate an application call tree for a fulfillment of a specific task. The method 400 starts with the selection of a set of log files that comprise the same session identifier (box 401). A set of log files may consist only of one log file or of a plurality of log files. Among the set of log files, data records belonging to the fulfillment of the specific task are extracted based on the stored task identifier (box 403). For example, if the application call tree for the task with the task identifier "1213" is generated from the log file depicted in FIG. 3a, all data records with this task identifier are extracted, i.e. the first five data records.

The generation of the application call tree itself starts with generating a root node referring to the task (box 405). This root node is tagged with the task identifier, e.g. with the number "1213". Alternatively, the root node is not tagged with an identifier but the finally generated application call tree, or the file it is stored in, is tagged with the respective task identifier. Any other suitable tagging to associate the application call tree with the respective task are possible, too. After generating a root node, wherein generating comprises storing this root node in a specific data structure, initializing a root node object, writing data corresponding to the root node into a file, or any other suitable method, the data record associated with the first application called during the fulfillment of the task is selected (box 407). This selection is facilitated by the call sequence number stored in the log files as this number indicates which application called which other application(s) during fulfillment of the task. A node corresponding to the selected data record, i.e. associated with the first called application, is added to the application call tree and linked to the root node (box 411).

Then, the next data record among the data records of the fulfillment of the task, i.e. the data record comprising a next call sequence number, is selected (box 411). Although the call sequence number of an application may be higher than the call sequence number of another application, this does not necessarily indicate that these applications are called in a subsequent order. They can also be called in parallel. For example, the applications "APPL34" and "APPL36" of the example log file of FIG. 3a have been called in parallel as indicated by the time stamp, although the call sequence number "1-1-1" of "APPL34" is lower than "1-1-3" of "APPL36".

If the data record is properly selected and existing (box 413—no-path), a node corresponding to the selected data record, i.e. associated with the called application, is added to the application call tree and linked to the parent application, i.e. to the application calling the respective application (box 415). The called application is also named child application. Therefore, the application call tree represents calling relationships of applications or, in other words, a parent and child application calling structure.

If a data record for the next call sequence number is missing (box 413—yes-path), a node and a link are anyway added to the application call tree although no further information is provided by a data record (box 417). However, based on the missing call sequence number, it can be determined where to add a node and a link. For example, in the log file of FIG. 3a, it can be determined that (at least) the data records for the applications with the call sequence numbers "1-1-2" and "1-2" are missing. Thus, nodes and links are added to the application call tree and marked as missing or the like.

Selecting data records with the next call sequence number and adding respective nodes and links to the application call tree (boxes 411 to 417) are performed repeatedly until all data records of the same session with the same task identifier and/or all missing data records for the fulfillment of the task have been handled as described. The finally generated application called tree is then stored on a database server, such as the database server 113.

FIG. 5 shows two application call trees generated from the log file of FIG. 3a. The first application call tree 510 depicts the application call tree generated for the task with the task identifier "1213". The root node 511 is linked to the first called application "APPL10" 512 according to the first data record 306 of the log file. Application "APPL10" with the call sequence number "1" calls two applications: the first application is "APPL20" as indicated in the second data record 307; the second application is unknown as the data record is missing. However, as indicated by data record 310, there must be a call of an application with the call sequence number "1-2" because "APPL77" of data record 310 is a child application of this missing application, which is indicated by the call sequence number "1-2-1". Therefore, the node for application "APPL10" is linked to two nodes of child applications, i.e. to node 513 for application "APPL20" and to node 514 for a missing application. Node 514 is also linked to the node 518 of its child application "APPL77".

"APPL20" calls three applications as indicated by the example log file of FIG. 3a. Data records of two of them are listed, namely data record 308 of application "APPL34" with call sequence number "1-1-1" and data record 309 of application "APPL36" with call sequence number "1-1-3". However, one data record of a called application is missing in this example as the call sequence number "1-1-2" is missing in the log file. The call sequence numbers are structured in a manner so that missing data records can be determined at least in cases that a subsequent number is present where an antecedent number is missing. Since the missing data records are identified based on the call sequence number, a node and link can be added. As a result, the node for application "APPL20" is linked to three nodes of child applications, i.e. to node 515 for application "APPL34", to node 517 for application "APPL36", and to node 516 for a missing application.

The second application call tree 520 of FIG. 5 shows the application call tree for the task "2207" comprised by the log file of FIG. 3a. It again comprises a root node 521. As can be seen, no missing data records have been detected and the application call tree 5210 only comprises nodes 522, 523, 524, and 525 that have been included based on data records comprised by the log file of FIG. 3a.

Generating the application call tree may further comprise calculating a checksum for a node and storing the checksum at the node. The first application call tree 510 of FIG. 5 shows in dashed boxes examples of stored checksums at the nodes 511 to 518. The checksum may be at least partially based information relating to at least one parent application during fulfillment of the task. In this example, the checksums are calculated based on the checksum of the parent node and the number comprised by the application identifier of the node. For example, the node 513 has the checksum "30" as its parent node 512 has the checksum "10" and the number comprised by its application identifier "APL20" is "20".

As can be seen from the example of the first application call tree 510 in FIG. 5, no checksums can be calculated for missing nodes 514 and 516. However, if the checksum is calculated otherwise, for example only based on information of the parent nodes, a checksum may also be calculated for missing nodes. In another embodiment, the checksum may be created as a 128-bit MD5 checksum from a string comprising at least a part of the data stored in the data records for at least one parent application. For example, the string is composed of the task identifier, the application identifier of the parent application, the call sequence number of the parent application, the application identifier of the parent's parent application, and the call sequence number of the parent's parent application. Other combinations of information comprised by the data records of at least one parent application and/or of the respective application are possible as well as the use of other checksum generation algorithms, such as for example CRC, SFV, SHA1, and SHA256.

Retrieving at least one log file from the at least one database server and/or generating an application call tree for a fulfillment of a task may be repeatedly executed at predetermined times. In an example, the analysis module 114 is configured to retrieve every second/minute/hour/day those log files from the database server 113 that were generated in the last second/minute/hour/day. Based on these log files, the analysis module 114 may generate application call trees for the fulfillment of the tasks comprised by the respective log files. These generated application call trees are then stored on the database server 113.

To monitor a distributed server environment on the basis on application call trees, the generated application call trees are finally aggregated to determine statistical values and detect performance issues. FIG. 6 shows example application call trees for the fulfillment of the task with the task identifier "1213" as indicated in the root nodes 611 to 6N1, with N indicating that there may be a plurality of N generated application call trees for this task. Although only response times of the respective applications are exemplarily depicted on the links/edges of the application call trees, the information stored along with the application call trees may comprise any data stored in and/or calculated based on the data records on which the application call tree has been generated.

These application call trees are then aggregated to one averaged application call tree for the task with the task identifier "1213". In the presented example, the application call trees comprise checksums. These may help to find the correct nodes to aggregate by comparing the checksums of the nodes. In the examples of FIG. 6, the nodes 614 and 617 as well as 6N4 and 6N7 are nodes of the application with the application identifier "APPL36". When aggregating the two call trees 610 and 6N, there is a risk that node 617 is aggregated with node 6N4 or node 6N7 is aggregated with node 614. To avoid this, the parent nodes may be compared. However, this requires the application call tree to be stored in a manner that the parent nodes are easily retrievable when aggregating application call trees. In each case, comparing parent nodes requires additional searches in the application call trees and, thus, might be time consuming. Therefore, storing checksums at the nodes can reduce the time needed to build the averaged application call trees and facilitate referential integrity during aggregation of the application call trees.

A possible resulting averaged application call tree generated as aggregation of the application call trees of FIG. 6 is shown in FIG. 7. The averaged application call tree comprises statistical, e.g. averaged or summarized, data. In the averaged application call tree 710 of FIG. 7, averaged response times are indicated on the links. These averaged response times may be mean response times of all the aggregated application call trees 610 to 6N0. For example, application "APPL10" (node 712), which is the starting application when fulfilling task "1213", has a mean response time of 150.17 ms and "APPL36" (on node 717) has a mean response time of 55.81 ms.

If further information is stored at the application call trees, e.g. the whole or a part of the information comprised by the data records associated with the call tree, other statistical data may also be comprised by the averaged application call trees. For example, the statistical data may be the mean, maximum and/or minimum response times of the respective application, a number of total calls of the respective application, a percentage of calls for the respective application for fulfilling the task, and/or a mean computational load of the respective executing application servers.

The statistical data as well as further information about the application call trees, such as information which application calls which other applications when fulfilling a specific task or the like, can be used to generate a knowledge database. In an example, the knowledge data base is stored on the database server 113 and helps to fill the missing nodes and links when generating application call trees. For example, the two missing nodes of the application call tree 510 of FIG. 5, i.e. the nodes 514 and 516, can be modified based on the stored information of the knowledge database.

For example, if the knowledge database comprises the information stored in the averaged application call tree 710 of FIG. 7, the missing nodes are likely to correspond to the nodes 714 and 716 for applications "APPL36" and "APPL35". Therefore, the application call tree can be modified so that node 514 will not be marked as missing but associated with "APPL36" and node 516 will be associated with "APPL35". Moreover, statistical data stored in the knowledge database can be added to the modified application call tree if applicable. However, to distinguish modified application call trees from non-modified application call trees, the modified application call trees and/or the modified nodes are marked as modified.

Generating an averaged application call tree for a fulfillment of a task may also be repeatedly executed at predetermined times. For example, the analysis module 114 may be configured to retrieve every minute/hour/day those generated application call trees from the database server 113 that were generated in the last minute/hour/day. Based on these application call trees, the analysis module 114 may generate averaged application call trees for the fulfillment of the tasks comprised by the respective application call trees. These generated averaged application call trees are then stored on the database server 113 as well.

In order to analyze the averaged application call trees with regard to performance issues of the distributed application server environment, the statistical values of a currently generated averaged application call tree are compared with statistical values of previously generated averaged application call trees. For example, the mean/maximal/minimal response times may be compared. If a response time is significantly higher/lower than before, i.e. exceeding a predefined threshold, a performance issue may be detected. Alternatively or additionally, the number of calls of the applications in the averaged application call tree are compared. If an application is not called anymore or is only called some less times but has been called several times in the previously generated application call trees, a performance issue is also detected.

The averaged application call tree 710 of FIG. 7 may be the currently generated application call tree and the averaged application call tree 720 of FIG. 7 may be a previously generated averaged application call tree in which no performance issues have been detected and, hence, comprises response times that were usual for the applications in the past. Thus, comparing the mean response times of the applications in the previously generated averaged application call tree 720 with the response times of the same applications of the currently generated averaged application call tree 710, e.g. determining the difference of the response times, can be used to detect performance issues of the monitored distributed application server system.

For example, the mean response times for all applications on the nodes 715, 717, 714, and 718 differ less than 5% from the previously determined response times of the applications on the nodes 725, 727, 724, and 728. However, the differences of the mean response times of applications on the nodes 712, 713, and 716 and the mean response times of the corresponding applications on the nodes 722, 723, and 726 are considerably higher. "APPL10" currently (node 712) requires 29.64 ms (+24.59%) more to respond than it did before (node 722), "APPL20" currently (node 713) requires 28.21 ms (+94.72%) more to respond than it did before (node 723), and "APPL35" currently (node 716) requires 40.69 ms (+269.11%) more to respond than it did before (node 726).

Assume that the threshold for detecting a performance issue based on response times is predetermined to be 30%. Other threshold values can be applied, too. For example, the threshold may also be set to 5%, 10%, 15%, 20%, 25% or any other suitable value. The threshold values can also differ for each of the statistical values or be similar for some of the statistical values and different for others. With the threshold of 30% as assumed, the differences of the mean response times exceed this threshold for "APPL20" (node 713) and "APPL35" (node 716).

Therefore, a performance issue is detected for the monitored distributed application server environment. In response to a detected performance issue, an output message is generated. For example, if the output message is a message text on a computer screen, the message informs the system administrator about the performance issue and suggest possible modifications of the distributed server environment 110. If the output message is a stored file, an application using this file can refactor or reprogram the applications causing the performance issue or display a message to a system administrator. If the output message is a signal transmitted to a modification module, which may be the analysis module 114 itself or another module, the message initiates a modification of the distributed application server environment automatically.

As a performance issue caused by one application or application server often also affects the performance of other applications or application servers, additional parameters may be taken into account before initiating the modification of the distributed application server environment.

In the example of FIG. 7, the performance issue is, for example, caused by the application server executing the application "APPL35" when this application is called by the application "APPL20". However, this is not clear only by comparing the differences of the response times. Therefore, it may be advantageous—in case a performance issue is detected—to further analyze the averaged application call tree. For example, if a plurality of the same statistical values at different nodes, e.g. response times for applications "APPL20" and "APPL35", exceed the predetermined threshold, the node causing the excess is determined, e.g. application "APPL35", by determining the cause of the performance issue in the node exceeding the threshold the most or in the node that is the deepest, i.e. the furthest away from the root, in the averaged application call tree.

To further concretize whether the application itself or the server executing the application causes the performance issue, the mean server load may be checked in the averaged application call tree. Additionally or alternatively, it can be determined whether the application that was detected to cause to performance issue when fulfilling the task is called for fulfillments of other tasks and executed on a different server. If this is the case and the response times in the currently generated averaged application call tree of the other task is as usual, it can be detected that the performance issue was not caused by the application but by the executing application server.

If the cause of the performance issue has been finally detected, the distributed application server environment is modified to resolve the performance issue or at least improve the performance. Modifications may comprise adding a new application server to the distributed application server environment, redirecting the execution of an application from one application server to another application server within the distributed application server environment, and reconfiguring a sequence, in which the applications are called for execution of a task.

In the example given above that the application server executing application "APPL35 causes the performance issue, e.g. because the load on the application server is too high and there is a bottleneck when executing the application, a new application server may be added to the distributed application server environment and additionally assigned for executing "APPL35". In another example, if the performance issue is detected to be caused by a false programming code of an application, a new software version of the code can be loaded to be executed in the distributed application server environment.

All publications and existing systems mentioned in this specification are herein incorporated by reference.

The scope of the claims should not be limited by the embodiments set forth in the above examples, but should be given the broadest interpretation consistent with the description as a whole.

The invention claimed is:

1. A computer-implemented method for monitoring a distributed application server environment connected to a plurality of client terminals, wherein a client terminal requests at least one fulfillment of a task during a session, a task requiring the execution of at least one of a plurality of applications, wherein the method comprises:
storing log files on at least one database server, wherein the log files comprise data records associated with calls of applications executed for a fulfillment of a task, wherein each data record comprises a session identifier for identifying the session, a task identifier for identifying the task, and a calling sequence number for identifying a position of one of the applications in a sequence of called applications executed during a fulfillment of a task;
retrieving at least one log file from the at least one database server, wherein at least one data record for a call of an application is missing in at least one of the log files;
generating an application call tree for a fulfillment of a task from the at least one log file, the application call tree comprising nodes representing called applications during the fulfillment of the task and links representing calling relationships between the applications required to fulfill the task, wherein generating the application call tree comprises:
adding nodes and links to the application call tree based on the calling sequence numbers comprised by the data records of the at least one log file; and
storing data comprised by the data records at the respective node and/or link;
aggregating a plurality of application call trees for the same task to generate an averaged application call tree, wherein the average application call tree comprises statistical data calculated based on data stored at the application call trees;
analyzing the averaged application call tree with regard to performance issues; and
in response to a detection of a performance issue, generating an output message.

2. The computer-implemented method of claim 1, wherein adding nodes and links to the application call tree comprises:
selecting a set of log files comprising the same session identifier;
identifying a set of data records comprised by the set of log files based on the task identifier;
generating a root node referring to the task;
selecting the data record among the set of data records associated with a first application based on the call sequence number, wherein the first application is the application that is called first during the fulfillment of the task;
adding a node to the application call tree for the first application, wherein the node is linked to the root node;
repeatedly selecting a data record with a next call sequence number and adding a node to the application call tree for the respective application with a link to the node of a parent application, wherein the parent application is the application calling the respective application during fulfillment of the task; and
in response to detecting a missing data record for a call of an application based on a missing call sequence number, adding a node and a link based on the missing call sequence number to the application call tree.

3. The computer-implemented method of claim 1, wherein generating the application call tree comprises:
calculating a checksum for a node, wherein the checksum is at least partially based on at least one parent application during fulfillment of the task; and
storing the checksum at the node;
and wherein aggregating a plurality of application call trees for the same task comprises:
comparing the checksums of the nodes of the plurality of application call trees for determining nodes to be aggregated.

4. The computer-implemented method of claim 3, wherein the checksum is created as a 128-bit MD5 checksum from a string comprising at least a part of the data stored in the data records for at least one parent application.

5. The computer-implemented method of claim 1, further comprising:

generating a knowledge database, wherein the knowledge database comprises information about generated application call trees;

and wherein generating the application call tree further comprises:

determining for nodes and links, which were added to the application call tree based on a missing call sequence number, data to be stored at the respective node and/or link based on the knowledge database; and marking the application call tree as modified.

6. The computer-implemented method of claim 1, wherein a data record associated with a call of an application further comprises at least one of a reference to a parent application of the respective application, a time stamp of the call of the respective application, a time stamp of the return of the respective application, a computational load of an executing application server, a computational capacity of the executing application server, and a IP address of the executing application server.

7. The computer-implemented method of claim 1, wherein the statistical data comprised by the averaged application call tree comprises at least one of number of total calls of the respective application, percentage of calls for the respective application for fulfilling the task, and mean computational load of respective executing application servers.

8. The computer-implemented method of claim 1, wherein the statistical data comprised by the averaged application call tree comprises at least one of mean, maximum and minimum response times of the respective application.

9. The computer-implemented method of claim 1, wherein analyzing the averaged application call tree with regard to performance issues comprises:

comparing the statistical values of the generated averaged application call tree with the statistical values of a previously generated averaged application call tree of the same task; and in response to difference of a statistical value of the generated averaged application call tree to a corresponding statistical value of the previously generated averaged application call tree exceeding a threshold, detecting a performance issue.

10. The computer-implemented method of claim 1, wherein retrieving at least one log file from the at least one database server, generating an application call tree for a fulfillment of a task, and aggregating a plurality of application call trees are repeatedly executed at predetermined times for tasks comprised by log files stored between a previous time of execution and a current time of execution.

11. The computer-implemented method of claim 1, wherein at least one of the generated application call trees or the averaged application call trees are stored on the at least one database server.

12. The computer-implemented method of claim 1, wherein the generated output message initiates a modification of the distributed application server environment, wherein the modification comprises at least one of adding a new application server to the distributed application server environment, redirecting the execution of an application from one application server to another application server within the distributed application server environment, and reconfiguring a sequence, in which the applications are called for execution of a task.

13. A data processing system for monitoring a distributed application server environment connected to a plurality of client terminals, wherein a client terminal requests at least one fulfillment of a task during a session, a task requiring the execution of at least one of a plurality of applications, wherein the distributed application server environment comprises:

a plurality of application servers, on which the plurality of applications is executed;

at least one database server;

a central control unit connected to the plurality of application servers, to the at least one database server and to the plurality of client terminals; and an analysis module connected at least to the database server;

wherein the central control unit is configured to:

store log files on at least one database server, wherein the log files comprise data records associated with calls of applications executed for a fulfillment of a task, wherein each data record comprises a session identifier for identifying the session, a task identifier for identifying the task, and a calling sequence number for identifying a position of one of the applications in a sequence of called applications during a fulfillment of a task;

wherein the analysis module is configured to:

retrieve at least one log file from the at least one database server, wherein at least one data record for a call of an application is missing in at least one of the log files;

generate an application call tree for a fulfillment of a task from the at least one log file, the application call tree comprising nodes representing called applications during the fulfillment of the task and links representing calling relationships between the applications required to fulfill the task, by:

adding nodes and links to the application call tree based on the calling sequence numbers comprised by the data records of the at least one log file; and storing data comprised by the data records at the respective node and/or link;

aggregate a plurality of application call trees for the same task to generate an averaged application call tree, wherein the average application call tree comprises statistical data calculated based on data stored at the application call trees;

analyze the averaged application call tree with regard to performance issues; and in response to a detection of a performance issue, generate an output message.

14. The data processing system of claim 13, wherein the analysis module is further configured, in order to add nodes and links to the application call tree, to:

select a set of log files comprising the same session identifier;

identify a set of data records comprised by the set of log files based on the task identifier;

generate a root node referring to the task;

select the data record among the set of data records associated with a first application based on the call sequence number, wherein the first application is the application that is called first during the fulfillment of the task;

add a node to the application call tree for the first application, wherein the node is linked to the root node;

repeatedly select a data record with a next call sequence number and add a node to the application call tree for the respective application with a link to the node of a parent application, wherein the parent application is the application calling the respective application during fulfillment of the task; and in response to detecting a missing data record for a call of an application based on a missing call sequence number, add a node and a link based on the missing call sequence number to the application call tree.

15. The data processing system of claim 13, wherein the analysis module is further configured, in order to generate the application call tree, to:

calculate a checksum for a node, wherein the checksum is at least partially based on at least one parent application during fulfillment of the task; and store the checksum at the node;

and wherein the analysis module is further configured, in order to aggregate a plurality of application call trees for the same task, to:

compare the checksums of the nodes of the plurality of application call trees for determining nodes to be aggregated.

16. The data processing system of claim 15, wherein the checksum is created as a 128-bit MD5 checksum from a string comprising at least a part of the data stored in the data records for at least one parent application.

17. The data processing system of claim 13, wherein the analysis module is further configured to:

generate a knowledge database, wherein the knowledge database comprises information about generated application call trees;

and wherein the analysis module is further configured, in order to generate the application call tree, to:

determine for nodes and links, which were added to the application call tree based on a missing call sequence number, data to be stored at the respective node and/or link based on the knowledge database; and mark the application call tree as modified.

18. The data processing system of claim 13, wherein a data record associated with a call of an application further comprises at least one of a reference to a parent application of the respective application, a time stamp of the call of the respective application, a time stamp of the return of the respective application, a computational load of an executing application server, a computational capacity of the executing application server, and a IP address of the executing application server.

19. The data processing system of claim 13, wherein the statistical data comprised by the averaged application call tree comprises at least one of number of total calls of the respective application, percentage of calls for the respective application for fulfilling the task, and mean computational load of respective executing application servers.

20. A non-transitory computer readable medium comprising instructions executable by a computer for monitoring a distributed application server environment connected to a plurality of client terminals, wherein a client terminal requests at least one fulfillment of a task during a session, a task requiring the execution of at least one of a plurality of applications, wherein execution of the instructions causes the computer to:

store log files on at least one database server, wherein the log files comprise data records associated with calls of applications executed for a fulfillment of a task, wherein a data record comprise a session identifier for identifying the session, a task identifier for identifying the task and a calling sequence number for identifying the sequence of called applications during a fulfillment of a task;

retrieve at least one log file from the at least one database server, wherein at least one data record for a call of an application is missing in at least one of the log files;

generate an application call tree for a fulfillment of a task from the at least one log file, the application call tree comprising nodes representing called applications during the fulfillment of the task and links representing calling relationships between the applications required to fulfill the task, wherein generating the application call tree comprises:

add nodes and links to the application call tree based on the calling sequence numbers comprised by the data records of the at least one log file; and store data comprised by the data records at the respective node and/or link;

aggregate a plurality of application call trees for the same task to generate an averaged application call tree, wherein the average application call tree comprises statistical data calculated based on data stored at the application call trees;

analyze the averaged application call tree with regard to performance issues; and in response to a detection of a performance issue, generating an output message.

* * * * *